(12) United States Patent
Kowalevicz et al.

(10) Patent No.: US 11,307,395 B2
(45) Date of Patent: Apr. 19, 2022

(54) METHODS AND APPARATUS FOR OPTICAL PATH LENGTH EQUALIZATION IN AN OPTICAL CAVITY

(71) Applicant: RAYTHEON COMPANY, Waltham, MA (US)

(72) Inventors: Andrew Kowalevicz, Arlington, VA (US); Benjamin P. Dolgin, Alexandria, VA (US); Gary M. Graceffo, Burke, VA (US); Paul Searcy, Denver, CO (US); Rizwan Parvez, Denver, CO (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/881,962

(22) Filed: May 22, 2020

(65) Prior Publication Data

US 2020/0371328 A1   Nov. 26, 2020

Related U.S. Application Data

(60) Provisional application No. 62/852,006, filed on May 23, 2019.

(51) Int. Cl.
*H04B 10/66* (2013.01)
*G02B 17/00* (2006.01)

(52) U.S. Cl.
CPC ........... *G02B 17/004* (2013.01); *H04B 10/66* (2013.01)

(58) Field of Classification Search
CPC ....... G02B 17/007; G02F 1/213; H04B 10/66; H04B 10/11
See application file for complete search history.

(56) References Cited

U.S. PATENT DOCUMENTS

| | | | |
|---|---|---|---|
| 4,172,663 A | 10/1979 | Byer et al. | |
| 4,417,964 A | 11/1983 | Wolfrum et al. | |
| 4,980,892 A | 12/1990 | Cunningham et al. | |
| 5,777,768 A | 7/1998 | Korevaar | |

(Continued)

FOREIGN PATENT DOCUMENTS

| | | |
|---|---|---|
| EP | 0426357 A2 | 5/1991 |
| JP | H06265832 A | 9/1994 |

(Continued)

OTHER PUBLICATIONS

D. W. Ball, Field Guide to Spectroscopy, SPIE Press, Bellingham, WA (2006), https://spie.org/publications/fg08_p13_index_of_refraction?SSO=1.*

(Continued)

*Primary Examiner* — Tanya T Motsinger
(74) *Attorney, Agent, or Firm* — Lando & Anastasi, LLP

(57) ABSTRACT

Method and apparatus to maintain a resonant condition of an optical cavity such that the optical path length through the optical cavity is independent or minimally dependent on the angle of incidence of a received optical signal are disclosed. A material within the optical cavity has an index of refraction that varies as a function of an angle of propagation of light within the material, thereby achieving the independence of the optical path length and the angle of incidence. The resonant condition is maintained over a range of angles of incidence of the received optical signal.

17 Claims, 6 Drawing Sheets

(56) References Cited

U.S. PATENT DOCUMENTS

| | | | |
|---|---|---|---|
| 5,896,005 A * | 4/1999 | Gurvitch | G02F 1/0147 313/498 |
| 5,912,748 A | 6/1999 | Wu et al. | |
| 6,466,707 B1 * | 10/2002 | Dawes | G02B 6/10 385/123 |
| 6,816,315 B1 * | 11/2004 | Ai | G02B 26/0875 359/629 |
| 6,868,237 B2 | 3/2005 | Willebrand et al. | |
| 6,882,764 B1 * | 4/2005 | Deng | G02B 6/125 359/333 |
| 7,039,278 B1 | 5/2006 | Huang et al. | |
| 7,158,281 B2 | 1/2007 | Chen et al. | |
| 7,361,884 B2 | 4/2008 | Tanaka et al. | |
| 7,711,441 B2 | 5/2010 | Tillotson | |
| 7,907,648 B2 | 3/2011 | Matsui et al. | |
| 8,427,649 B2 | 4/2013 | Hays et al. | |
| 8,929,408 B1 | 1/2015 | Diels et al. | |
| 9,018,575 B2 | 4/2015 | Kowalevicz et al. | |
| 9,091,853 B2 * | 7/2015 | Longeaud | G02B 26/0816 |
| 9,165,963 B2 | 10/2015 | Kowalevicz et al. | |
| 9,171,219 B2 | 10/2015 | Kowalevicz | |
| 9,323,034 B2 | 4/2016 | Dolgin | |
| 9,400,414 B2 | 7/2016 | Kowalevicz | |
| 9,451,185 B2 | 9/2016 | Dolgin et al. | |
| 9,503,660 B2 | 11/2016 | Kowalevicz et al. | |
| 9,535,245 B1 | 1/2017 | Kowalevicz | |
| 9,538,096 B2 | 1/2017 | Dolgin | |
| 9,887,779 B2 | 2/2018 | Kowalevicz | |
| 9,973,281 B2 | 5/2018 | Kowalevicz et al. | |
| 9,989,700 B1 | 6/2018 | Ayliffe et al. | |
| 10,164,765 B2 | 12/2018 | Dolgin et al. | |
| 10,177,856 B2 | 1/2019 | Kowalevicz et al. | |
| 10,205,526 B2 | 2/2019 | Kowalevicz | |
| 10,225,020 B2 | 3/2019 | Dolgin et al. | |
| 10,243,670 B2 | 3/2019 | Kowalevicz et al. | |
| 10,243,673 B2 | 3/2019 | Dolgin et al. | |
| 10,250,292 B2 | 4/2019 | Graceffo et al. | |
| 10,256,917 B2 | 4/2019 | Dolgin et al. | |
| 10,305,602 B2 | 5/2019 | Dolgin et al. | |
| 10,313,022 B2 | 6/2019 | Dolgin et al. | |
| 10,340,965 B2 | 7/2019 | Dolgin et al. | |
| 10,374,743 B2 | 8/2019 | Dolgin et al. | |
| 10,378,880 B2 | 8/2019 | Dolgin et al. | |
| 10,432,315 B2 | 10/2019 | Chen et al. | |
| 10,498,464 B2 | 12/2019 | Graceffo et al. | |
| 10,530,494 B2 | 1/2020 | Dolgin et al. | |
| 10,554,306 B1 * | 2/2020 | Graceffo | H04B 10/505 |
| 10,571,774 B2 | 2/2020 | Graceffo et al. | |
| 10,637,580 B2 | 4/2020 | Dolgin et al. | |
| 10,686,533 B2 | 6/2020 | Dolgin et al. | |
| 10,714,251 B2 | 7/2020 | Dolgin et al. | |
| 10,826,603 B1 | 11/2020 | Kowalevicz et al. | |
| 10,924,189 B2 | 2/2021 | Kowalevicz et al. | |
| 11,012,160 B2 | 5/2021 | Kowalevicz et al. | |
| 11,101,896 B2 * | 8/2021 | Kowalevicz | H04B 10/671 |
| 11,133,873 B1 | 9/2021 | Kowalevicz et al. | |
| 2002/0030439 A1 * | 3/2002 | Gurvitch | G02F 1/21 313/498 |
| 2002/0122614 A1 | 9/2002 | Zhou et al. | |
| 2002/0171908 A1 | 11/2002 | Copner et al. | |
| 2004/0013437 A1 | 1/2004 | Wiltsey et al. | |
| 2004/0080832 A1 * | 4/2004 | Singh | G02B 5/284 359/578 |
| 2004/0080834 A1 * | 4/2004 | Thompson | G02B 27/142 359/629 |
| 2005/0014472 A1 | 1/2005 | Cox et al. | |
| 2006/0140548 A1 | 6/2006 | Shin et al. | |
| 2006/0159135 A1 | 7/2006 | Cliche et al. | |
| 2006/0182154 A1 * | 8/2006 | Tanaka | H01S 3/139 372/9 |
| 2006/0262396 A1 | 11/2006 | Smith | |
| 2007/0076282 A1 * | 4/2007 | Kourogi | G02F 1/0311 359/237 |
| 2007/0171504 A1 * | 7/2007 | Fujimori | G02F 1/055 359/245 |
| 2009/0210191 A1 | 8/2009 | Rogers et al. | |
| 2010/0135670 A1 | 6/2010 | Amadeo et al. | |
| 2010/0253948 A1 * | 10/2010 | Strandjord | G01C 19/727 356/464 |
| 2011/0242290 A1 | 10/2011 | Arai | |
| 2011/0273758 A1 | 11/2011 | Wang et al. | |
| 2012/0147361 A1 * | 6/2012 | Mochizuki | H01S 5/4025 356/218 |
| 2012/0154542 A1 | 6/2012 | Katz et al. | |
| 2013/0099140 A1 | 4/2013 | Nakarai et al. | |
| 2013/0126755 A1 | 5/2013 | Kemnitz | |
| 2013/0278933 A1 | 10/2013 | Nozawa | |
| 2014/0240711 A1 | 8/2014 | Matsushita | |
| 2014/0314406 A1 | 10/2014 | Zerbe et al. | |
| 2016/0043794 A1 | 2/2016 | Ashrafi et al. | |
| 2016/0047987 A1 | 2/2016 | Du et al. | |
| 2016/0064894 A1 * | 3/2016 | Takiguchi | G02F 1/13439 372/26 |
| 2016/0209643 A1 * | 7/2016 | Tsikouras | G01J 3/2823 |
| 2016/0259185 A1 | 9/2016 | Osumi et al. | |
| 2016/0349284 A1 * | 12/2016 | Pradhan | G01B 9/02049 |
| 2016/0357189 A1 | 12/2016 | Barrows et al. | |
| 2016/0363648 A1 | 12/2016 | Mindell et al. | |
| 2017/0299882 A1 * | 10/2017 | New | G02B 27/4272 |
| 2018/0019807 A1 | 1/2018 | Hreha et al. | |
| 2018/0054259 A1 | 2/2018 | Kowalevicz et al. | |
| 2018/0091227 A1 | 3/2018 | Dolgin et al. | |
| 2018/0091228 A1 | 3/2018 | Kowalevicz et al. | |
| 2018/0091230 A1 | 3/2018 | Dolgin et al. | |
| 2018/0091232 A1 | 3/2018 | Dolgin et al. | |
| 2018/0102853 A1 | 4/2018 | Dolgin et al. | |
| 2018/0145764 A1 | 5/2018 | Dolgin et al. | |
| 2018/0145765 A1 | 5/2018 | Kowalevicz et al. | |
| 2018/0167145 A1 | 6/2018 | Dolgin et al. | |
| 2018/0212682 A1 | 7/2018 | Chen et al. | |
| 2018/0234231 A1 | 8/2018 | Dolgin et al. | |
| 2018/0275050 A1 | 9/2018 | Iguchi et al. | |
| 2018/0367223 A1 | 12/2018 | Graceffo et al. | |
| 2019/0007091 A1 * | 1/2019 | Graceffo | H04B 10/40 |
| 2019/0064629 A1 * | 2/2019 | Abouraddy | G02F 1/0126 |
| 2019/0158208 A1 * | 5/2019 | Dolgin | H04B 10/677 |
| 2019/0208183 A1 | 7/2019 | Schmidt et al. | |
| 2019/0257990 A1 * | 8/2019 | Hunter | H01S 5/146 |
| 2019/0295264 A1 | 9/2019 | Petilli | |
| 2019/0305853 A1 | 10/2019 | Dolgin et al. | |
| 2019/0319714 A1 | 10/2019 | Kowalevicz et al. | |
| 2019/0331941 A1 * | 10/2019 | Coolbaugh | G02B 6/12 |
| 2020/0096504 A1 | 3/2020 | Kawata et al. | |
| 2020/0136727 A1 | 4/2020 | Graceffo et al. | |
| 2020/0278272 A1 | 9/2020 | Kasahara et al. | |
| 2020/0371328 A1 * | 11/2020 | Kowalevicz | H04B 10/11 |
| 2020/0403709 A1 | 12/2020 | Graceffo et al. | |
| 2020/0409189 A1 | 12/2020 | Graceffo et al. | |
| 2021/0006336 A1 | 1/2021 | Kowalevicz et al. | |
| 2021/0021449 A1 | 1/2021 | Graceffo et al. | |
| 2021/0021775 A1 | 1/2021 | Lee | |
| 2021/0041515 A1 | 2/2021 | Dolgin | |
| 2021/0099232 A1 | 4/2021 | Graceffo et al. | |
| 2021/0099234 A1 | 4/2021 | Graceffo et al. | |
| 2021/0105073 A1 | 4/2021 | Graceffo et al. | |
| 2021/0126715 A1 | 4/2021 | Graceffo et al. | |

FOREIGN PATENT DOCUMENTS

| | | |
|---|---|---|
| WO | 8500484 A1 | 1/1985 |
| WO | 2007016537 A2 | 2/2007 |

OTHER PUBLICATIONS

International Search Report and Written Opinion of International Patent Application No. PCT/US2020/028941 dated Sep. 23, 2020.
Invitation to Pay Additional Fees from the International Searching Authority in International Patent Application No. PCT/US2020/042160 dated Oct. 16, 2020.

(56) References Cited

OTHER PUBLICATIONS

International Search Report and Written Opinion of International Patent Application No. PCT/US2020/040751 dated Oct. 19, 2020.
International Search Report and Written Opinion in International Patent Application No. PCT/US2020/042160 dated Dec. 7, 2020.

\* cited by examiner

METHODS AND APPARATUS FOR OPTICAL PATH LENGTH EQUALIZATION IN AN OPTICAL CAVITY

CROSS-REFERENCE TO RELATED APPLICATION

This application claims priority under 35 U.S.C. § 119(e) to U.S. Provisional Application Ser. No. 62/852,006, titled "METHODS AND APPARATUS FOR OPTICAL PATH LENGTH EQUALIZATION IN AN OPTICAL CAVITY," filed on May 23, 2019, which is hereby incorporated by reference in its entirety.

BACKGROUND

Many optical communication systems manipulate light waves to carry information. For instance, often a light source (e.g., a laser source) is modulated to change various properties of emitted light, such as an amplitude, phase, or frequency of the light to convey information. An optical receiver may receive an demodulate the light waves to recover the information. In various applications, including free-space optical communications, for example, there is a need to be able to receive communication signals from different angles without the variation in angle of arrival affecting the receiver performance. Mechanical gimbal solutions or beam-steering solutions with movable mirrors are used in some applications and are effective at maintaining transmitter/receiver alignment or otherwise compensating for variations in the angle of arrival of optical signals at the receiver. However, both these types of implementations require mechanical rotation in one or more planes, which can increase size, weight, cost and complexity of a system. In addition, for these solutions, imparted momentum to the platform results, which can be problematic in some applications.

SUMMARY OF INVENTION

Aspects and embodiments are directed to methods and apparatus for reducing the need for exact normal incidence, or another specific angle of incidence, of received optical signals in receiver systems that use an optical resonator and that do not need to track a moving signal source or do not require a dynamically variable operating condition of the resonator. Certain aspects and embodiments advantageously provide fixed and stable operation of an optical receiver over a range of angles of incidence of arriving optical signals, without the need for mechanical rotation systems.

According to one embodiment, an optical cavity comprises a first semi-reflective surface, a second semi-reflective surface, and a material interposed between the first and second semi-reflective surfaces, the material having an index of refraction that varies as a function of an angle of propagation of light within the material.

In one example, the first and second semi-reflective surfaces are disposed substantially parallel to one another, the material filling a gap between the first and second semi-reflective surfaces.

In another example, the material is selected to provide a constant optical path length through the optical cavity over a range of angles of incidence of the light on the first semi-reflective surface.

According to another embodiment, an optical receiver comprises an optical resonator assembly including at least one optical resonator configured to receive an input optical signal and including a material having an index of refraction that varies as a function of an angle of propagation of light within the material, and a detector configured to detect an intensity modulated output optical signal produced by the at least one optical resonator and to identify a modulation of the input optical signal based at least in part on an intensity modulation of the output optical signal.

In one example, the at least one optical resonator includes a first semi-reflective surface, and a second semi-reflective surface, the first and second semi-reflective surfaces disposed substantially parallel to one another, the material filling a gap between the first and second semi-reflective surfaces.

In another example, the material is selected to provide a constant optical path length through an optical cavity over a range of angles of incidence of the light on the first semi-reflective surface.

In one example, the at least one optical resonator is a Fabry-Perot etalon.

In another example, the at least one optical resonator is configured to maintain a selected resonator condition by maintaining a substantially constant optical thickness of the at least one optical resonator to the input optical signal over a range of angles of propagation of the input optical signal through the at least one optical resonator corresponding to the range of angles of incidence.

In one example, the at least one optical resonator includes a first semi-reflective surface positioned to receive the input optical signal, a second semi-reflective surface positioned facing the first semi-reflective surface and arranged to emit the output optical signal, and the material interposed between the first semi-reflective surface and the second semi-reflective surface, the at least one optical resonator being configured to accumulate resonant optical signal energy inside the at least one optical resonator and between the first semi-reflective surface and the second semi-reflective surface to approach a steady-state output value of the output optical signal, the intensity modulation of the output optical signal including a series of deviations from the steady-state output value.

In another example, the at least one optical resonator is an etalon having a pair of semi-reflective surfaces configured to at least partially trap resonant optical signal energy between the pair of semi-reflective surfaces by reflecting a portion of resonant optical signal energy between pair of semi-reflective surfaces, the etalon further including the material interposed between the pair of semi-reflective surfaces.

In one example, the detector includes at least one optical-electrical converter configured to convert the output optical signal into an electrical signal.

In another example, the at least one optical resonator is configured to accumulate resonant optical signal energy inside the at least one optical resonator based at least in part on the input optical signal, and to produce the intensity modulated output optical signal, the intensity modulation of the output optical signal being representative of a modulation of the input optical signal, the at least one optical resonator being configured to maintain a selected resonant condition of the at least one optical resonator over a range of angles of incidence of the input optical signal at the at least one optical resonator.

According to another embodiment, a method comprises the acts of receiving an input optical signal at an input of at least one optical resonator having a material interposed between first and second semi-reflective surfaces of the optical resonator, the material having an index of refraction that varies as a function of an angle of propagation of light within the material, accumulating a resonant condition with the at least one optical resonator based at least in part on the input optical signal to produce an intensity modulated output optical signal, an intensity modulation of the output optical signal being representative of a modulation of the input optical signal, and maintaining the resonant condition of the at least one optical resonator over a range of angles of incidence of the input optical signal at the at least one optical resonator.

In one example, the act of maintaining includes providing a constant optical path length through an optical cavity over a range of angles of incidence of the light on the first semi-reflective surface with the material filling a gap between the first and second semi-reflective surfaces.

In another example, the at least one optical resonator is a Fabry-Perot etalon. In one example, the act of maintaining the resonant condition includes maintaining a substantially constant optical thickness of the at least one optical resonator to the input optical signal over a range of angles of propagation of the input optical signal through the at least one optical resonator corresponding to the range of angles of incidence.

In another example, the method further comprises receiving the input optical signal at the first semi-reflective surface of the at least one optical resonator, emitting the output optical signal from the second semi-reflective surface positioned to face the first semi-reflective surface, and accumulating the resonant optical signal energy inside the at least one optical resonator and between the first semi-reflective surface and the second semi-reflective surface to approach a steady-state output value of the output optical signal, the intensity modulation of the output optical signal including a series of deviations from the steady-state output value, the material interposed between the first semi-reflective surface and the second semi-reflective surface.

In one example, the act of receiving includes receiving the input optical signal with an etalon having a pair of semi-reflective surfaces, the etalon at least partially trapping the resonant optical signal energy between the pair of semi-reflective surfaces by reflecting a portion of resonant optical signal energy between pair of semi-reflective surfaces, the etalon further including the material interposed between the pair of semi-reflective surfaces.

In another example, the method further comprises converting the output optical signal into an electrical signal with at least one optical-electrical converter.

In one example, the act of accumulating includes accumulating resonant optical signal energy inside the optical resonator based at least in part on the input optical signal, and providing the intensity modulated output optical signal, the intensity modulation of the output optical signal being representative of a modulation of the input optical signal, and maintaining a selected resonant condition of the at least one optical resonator over a range of angles of incidence of the input optical signal at the at least one optical resonator.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Figure 1:
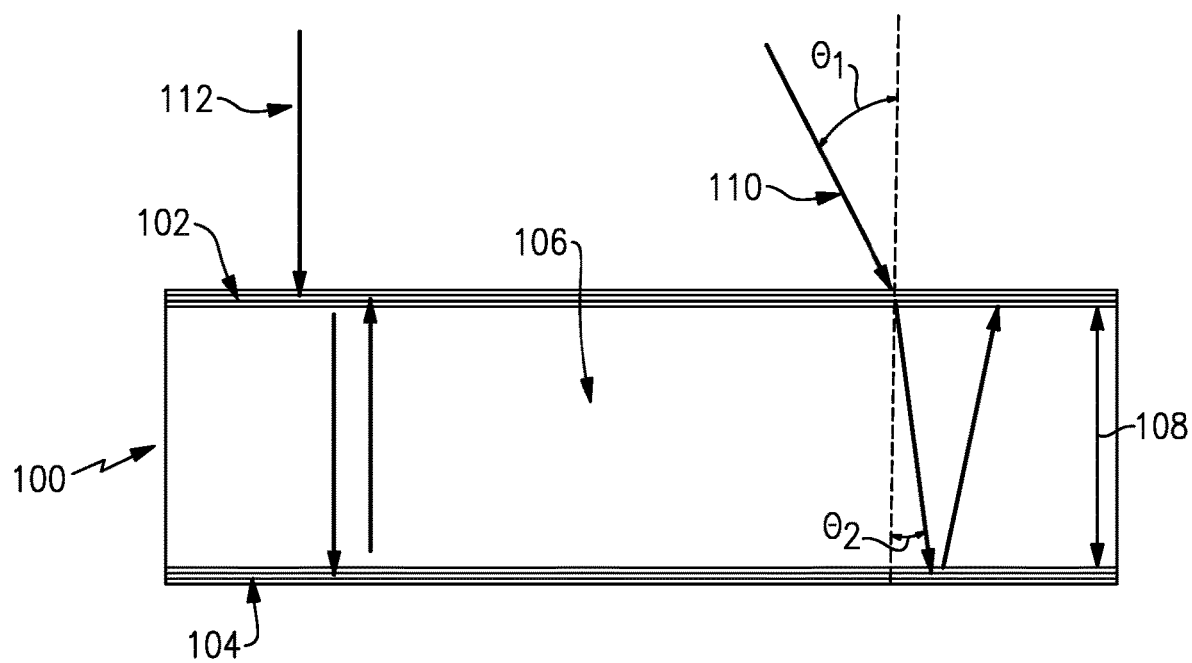
FIG. 1 is a schematic diagram of one example of an etalon.

Optical receivers according to certain embodiments use an optical resonator, such as a Fabry-Perot etalon, as a modulation converter. Using an optical resonator assembly in the demodulator of an optical receiver may offer advantages over conventional demodulation techniques, including the ability to demodulate weak optical signals without a locally coherent clock source. The arriving optical signals may be phase modulated, amplitude modulated, or frequency modulated, or may be modulated using a combination of these techniques (e.g., QAM methods), and the optical resonator assembly converts the received phase, amplitude, and/or frequency modulated optical signal into a directly detectable intensity modulated output signal. For many optical receivers; however, it may be necessary or desirable to receive optical signals over a relatively wide field of regard, which may correspond to a wide range of angles of incidence of the optical signals at the etalon. A standard Fabry-Perot etalon has an optical path length that changes depending on the incident angle of the received optical signal, which in turn may affect the response of the etalon. Thus, the output response signal may change as a function of the angle of incidence (also referred to as the angle of arrival) of the received optical signal, which may be undesirable in certain applications. Conventional systems attempt to address this issue by physically reorienting either the optical receiver itself (or components therefore, such as the etalon) or the incident beams (e.g., using beam-steering mirrors or lens arrangements) so as to maintain a specific angle of incidence, or very narrow range of angles of incidence, for the received optical signals. However, this approach has numerous drawbacks, as discussed above.

For certain applications, including but not limited to certain optical communications receivers, it is desirable to have the optical path length within the etalon be independent or minimally dependent on the angle of incidence. This condition effectively increases the acceptance angle for the etalon, allowing it to receive and operate on optical signals over a wider field of regard without requiring mechanical gimbals, beam-steering mechanisms, or other external components. Aspects and embodiments are directed to such an etalon structure, and to optical receivers using the etalon(s).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. The terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include radio waves, microwaves, infrared, visible, and/or ultraviolet electromagnetic radiation, or other non-ionizing electromagnetic radiation conventionally processed in the field of optics.

Referring to FIG. 1, there is illustrated a schematic diagram of a Fabry-Perot etalon 100, showing two optical signals 110, 112 received at the etalon 100 at different angles of incidence. The etalon 100 includes a pair of parallel surfaces 102, 104 with a dielectric material 106 between them. In the example shown in FIG. 1, the first surface 102 is at least semi-transparent to allow the optical signals 110, 112 to enter the etalon 100, and the second surface 104 is reflective or at least semi-transparent. The etalon 100 has a characteristic resonant frequency associated with a certain wavelength of light based upon the spacing between the surfaces 102, 104 (i.e., dimension 108, also referred to herein as the thickness, T, of the etalon 100). When the frequency of the arriving optical signals 110, 112 corresponds to the characteristic resonant frequency of the etalon 100, optical signal energy accumulates to build-up resonating optical signal energy inside the etalon 100, which can be said to be operating in a resonant mode or condition.

The resonance condition of the etalon 100 depends on the wavelength, λ, of the arriving optical signals 110, 112 and the optical path length of the etalon. In a conventional etalon, the optical path length is dependent on the angle of incidence of the arriving optical signal 110, 112 because that angle determines the angle at which the optical signal travels between the first and second surfaces 102, 104. In the example shown in FIG. 1, the first optical signal 110 is incident on the first surface 102 at an angle $\theta_1$ relative to normal, is refracted by the dielectric material 106, and travels through the etalon 100 at an angle $\theta_2$. In some examples where the second surface is reflective, the optical signal 112 makes a round trip through the etalon 100, as shown, and the optical path length (OPL) is given by:

$$OPL = \frac{2T}{|\cos(\theta_2)|} n \qquad (1)$$

In Equation (1), n is the index of refraction of the dielectric material 106. The second optical signal 112 arrives at the etalon 100 at normal incidence (i.e., $\theta_1=\theta_2=0$), and therefore the optical path length reduces to 2Tn. Thus, for a given wavelength, the optical path length of a conventional etalon 100 is shortest for normal incidence (optical signal 112) and increases as the angle of incidence of the optical signal 110 changes away from normal.

In certain instances, the resonance condition of the etalon 100 may be established when the optical path length is an integer multiple of λ/2 (in other instances, it may be desirable to have the optical path length to be non-integer multiples of λ/2). Thus, in a conventional etalon, the dependence of the optical path length of the etalon 100 on the angle of incidence or angle of arrival of the optical signals 110, 112 in turn causes the tuning or resonance of the etalon 100 to be dependent on the angle of arrival of the optical signals. In contrast, aspects and embodiments provide a Fabry-Perot etalon, or similar optical cavity structure in which the optical path length within the etalon is independent or minimally dependent on the angle of incidence.

Figure 2:
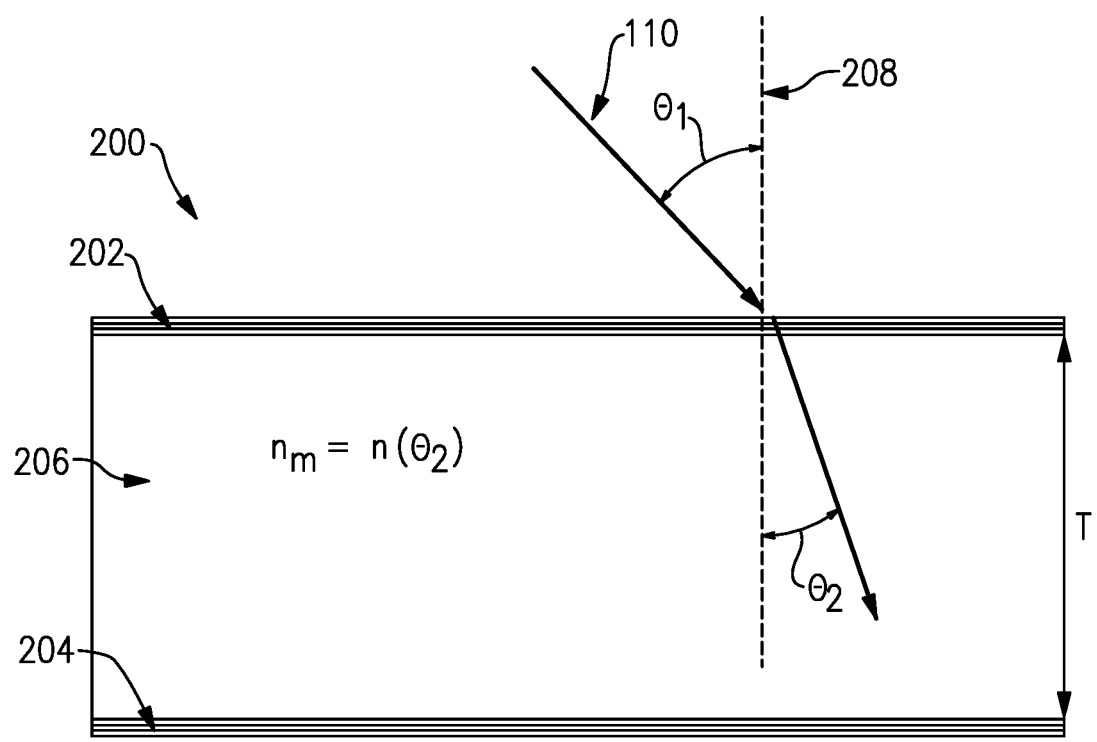
FIG. 2 is a schematic diagram of one example of an optical resonator according to aspects of the present invention.

Referring to FIG. 2, there is illustrated an example of optical cavity resonator 200 according to certain aspects. The optical cavity resonator 200 may be referred to herein as an etalon; however, the use of the term "etalon" throughout this disclosure is not intended to be limiting and as used herein may include any of multiple structures, including plates with reflecting surfaces as well as parallel mirrors with various materials in between, and may also be referred to as cavities, interferometers, and the like. In the illustrated example, the etalon 200 includes a pair of parallel semi-reflective surfaces 202, 204 with a dielectric material 206 interposed between them.

The surfaces 202, 204 are semi-reflective and also semi-transmissive, in that they allow some light through, and therefore the arriving optical signal 110 may be allowed into the etalon 200 and may resonate inside the etalon (i.e., in the material 206 between the two semi-reflective surfaces 202, 204), as discussed further below. The etalon 200 may have varying levels of reflectivity of the semi-reflective surfaces 202, 204. In certain examples, the reflectivity may be expressed as a fraction of light amplitude reflected back into the interior 206 or may be expressed as a fraction of light intensity reflected back into the interior 206. The reflectivity of each of the first and second semi-reflective surfaces 202, 204 may be the same or different, and may be any suitable value for a particular implementation. The etalon 200 is one example of a suitable optical resonator in accord with aspects and embodiments described herein. Additionally, etalon structures may be formed as a laminate, layer, film, coating, or the like. In some examples, an etalon may include reflective surfaces (including semi-reflective surfaces) that are not co-planar and/or are not co-linear. For example, an interior reflective surface of an etalon may include some curvature, and an opposing surface may also be curved such that a distance between the two surfaces is substantially constant across various regions of the etalon, in some examples. In other examples, an etalon may have non-linear or non-planar surfaces with varying distances between the surfaces at various regions, and may still function as an optical resonator for various wavelengths and at various regions, suitable for use in examples discussed herein. Accordingly, an etalon may be purposefully designed to conform to a surface, or to have various regions responsive to differing wavelengths, or responsive to differing angles of arrival for a given wavelength, in certain examples.

According to certain embodiments, the material 206 in the interior of the etalon 200 has an effective index of refraction that varies with the angle of propagation of light (e.g., the optical signal 110) within the material. Thus, referring to FIG. 2, $n_m = n(\theta_2)$, where $n_m$ is the index of refraction of the material 206 and $\theta_2$ is the angle of propagation of the optical signal 110 (shown relative to the normal 208) within the material 206. As shown in FIG. 2, the optical signal 110 propagates through a medium, such as, air (for free space communications, for example), at an angle $\theta_1$ and is incident on the first semi-reflective surface 202 at that angle $\theta_1$. The medium has an index of refraction $n_0$, which is typically different from the index of refraction, $n_m$, of the material 206 inside the etalon 200, and therefore the optical signal 110 is refracted by the material 206 and propagates through the material at the angle $\theta_2$. Snell's law of refraction provides:

$$n_0 * \sin\theta_1 = n(\theta_2) * \sin\theta_2 \qquad (2)$$

As discussed above, the optical path length, OPL, of the etalon 200 is relative to index of refraction of the material 206. Specifically, from Equation (1) above, $$OPL_S = \frac{T}{|\cos\theta_2|} n_m \qquad (3)$$

In Equation (3), OPLs is the optical path length of the etalon 200 for a single pass of the optical signal 110 through the material 206 from the first semi-reflective surface 202 to the second semi-reflective surface 204 (or vice versa). The optical path length for a "round trip" or "double pass" of the optical signal 110, similar to as shown in FIG. 1, is twice $OPL_S$, that is, $OPL_{RT} = 2*OPL_S$. In Equation (3), T is the physical thickness of the etalon 200 between the first and second semi-reflective surfaces 202, 204, as shown in FIG. 2.

Thus, from Equations (2) and (3), it can be seen that by selecting a material having an appropriate variation in index with angle, the optical path length for an optical signal 110 of a given wavelength can be made the same over a range of different angles of incidence, $\theta_1$. This concept is demonstrated with the following example. For normal incidence of the optical signal 110 ($\theta_1 = \theta_2 = 0$), the index of refraction of the material 206 is specified as $n_m = n(0) = n_1$. To compensate for variations in $\theta_1$ and maintain a constant optical path length of the etalon 200 that is the same as the optical path length for normal incidence, $$n_1 * T = \frac{n_m * T}{|\cos\theta_2|} \qquad (4)$$

Thus, Equation (4) indicates that the material 206 should have an index of refraction that varies as a function of $\cos(\theta_2)$. Specifically, $$n_m = n(\theta_2) = n_1 * \cos\theta_2 \qquad (5)$$

Figure 3B:
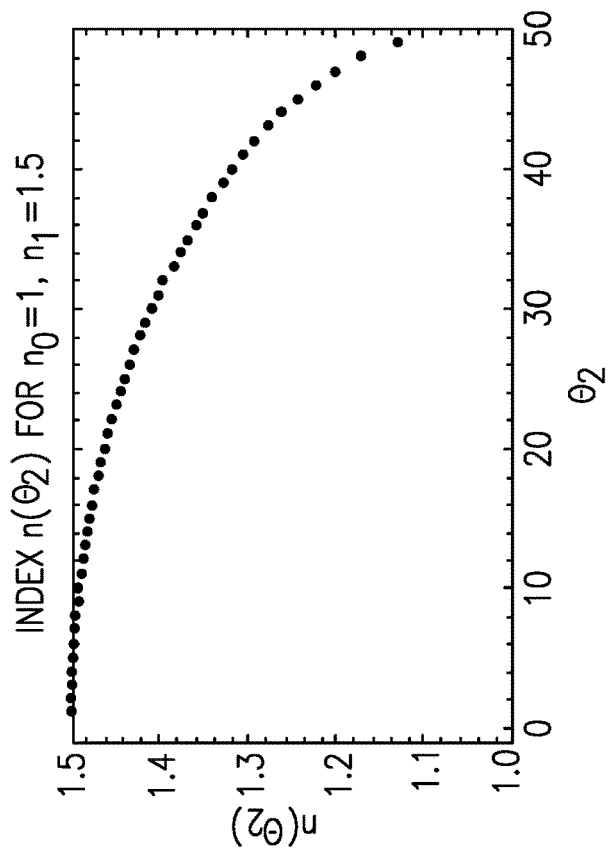
FIG. 3B is a graph showing an angle-dependent index of refraction as a function of propagation angle for an example of an angle-compensating optical cavity according to aspects of the present invention.
Figure 3A:
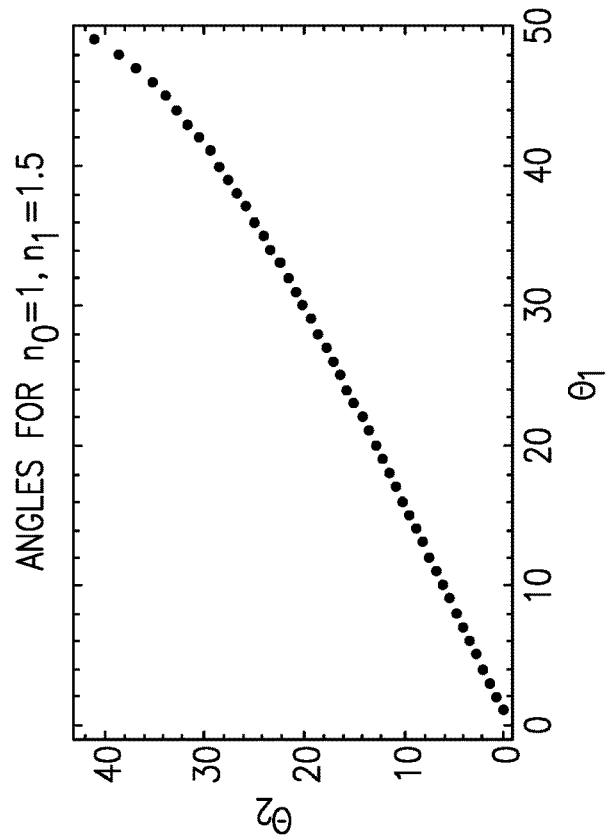
FIG. 3A is a graph showing a range of propagation angles versus incidence angles for an angle-compensating optical cavity according to aspects of the present invention.

Considering, as an example, $n_1 = 1.5$, similar to many glass materials, and $n_0 = 1$ (for air), the graphs shown in FIGS. 3A and 3B show the angle of transmission for conditions required for full compensation (FIG. 3A) and the index of refraction as a function of transmission angle for a material 206 satisfying full compensation (FIG. 3B). Theoretically, the incidence angle, $\theta_1$, may vary from normal incidence ($\theta_1 = 0°$) to almost 90° (the light rays are parallel to the semi-reflective surface 202); however, in practice the range of $\theta_1$ is smaller. For example, for values of $\theta_1$ approaching 90°, the optical signal 110 would not enter the etalon 200. FIG. 3A shows a range of $0° \leq \theta_1 < 50°$.

The material 206 may be a natural material or a man-made material that possesses the desired dependence of its refractive index ($n_m$) on the angle of propagation ($\theta_2$). An example of such a material is calcite.

Figure 3C:
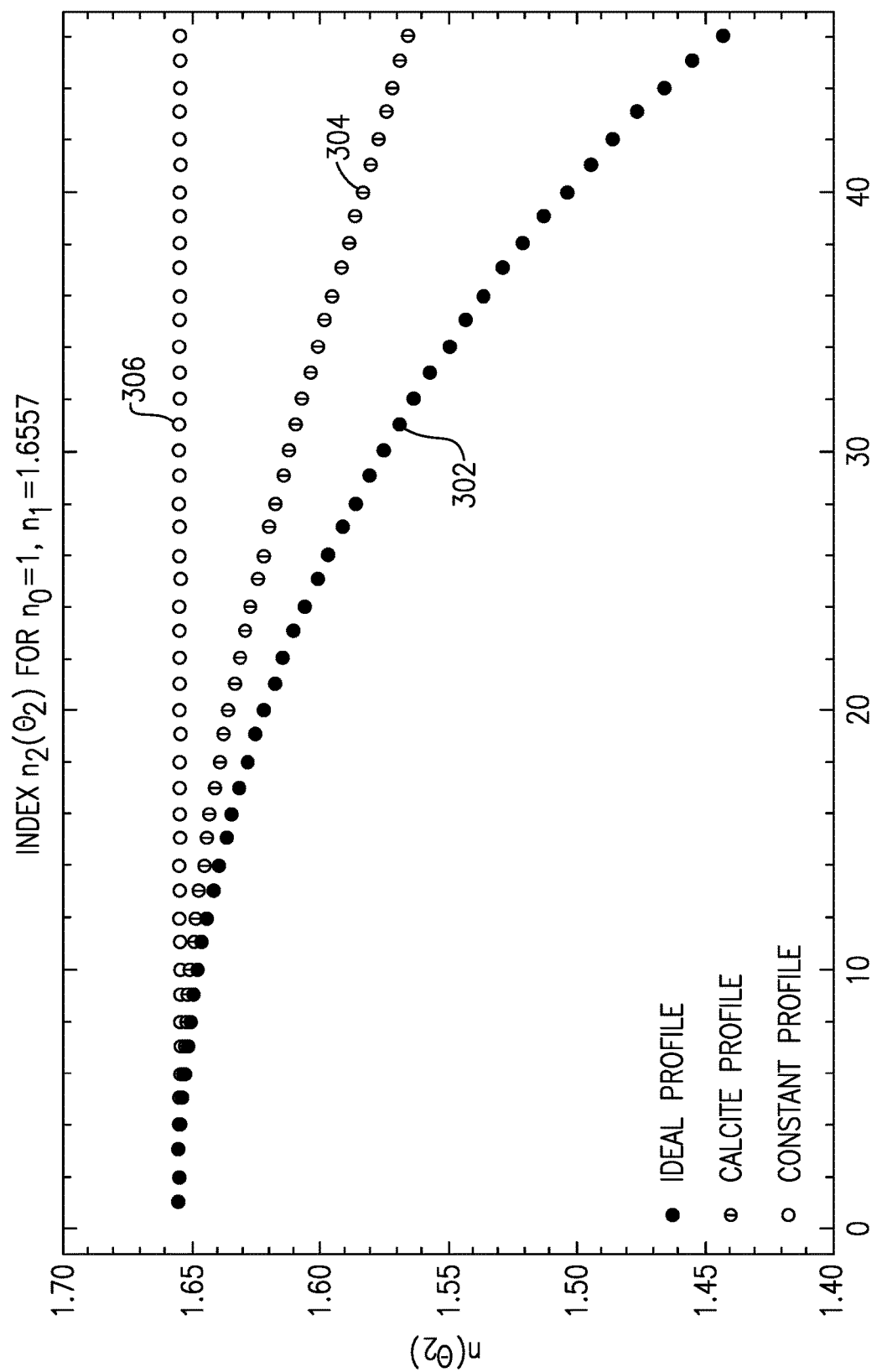
FIG. 3C is a graph showing three examples of different index of refraction profiles as a function of propagation angle.

FIG. 3C shows three different profiles for $n(\theta_2)$ as a function of $\theta_2$. Curve 302 corresponds to the ideal or theoretical case in which the material completely compensates for angle of incidence over a range from 0 to 45 degrees and provides equal optical path length. Curve 304 corresponds to the result for calcite, which has an angular dependence on effective index. Curve 306 corresponds to a constant index material (independent of angle of incidence). As shown, although calcite does not reach the ideal, it demonstrates an improvement over the constant index case. For calcite, $n_m = 1.6557$ at normal incidence and decreases with angle of incidence, as shown in FIG. 3C.

The above-discussed example demonstrates a relationship that maintains a relatively constant optical path length over a range of incidence angles that is approximately equal to the optical path length of the etalon 200 to light that is normally incident. However, in other examples, the "base-line" or reference point for the optical path length can be an angle of incidence ($\theta_1$) that is not normal, but rather some value relative to normal.

Thus, aspects and embodiments provide an approach to an operating point (relative resonant condition) of an optical cavity, such as the etalon 200, regardless of the incident angle of the received light, at least over a certain range of incidence angles. This approach may significantly increase the acceptance angle of a Fabry-Perot etalon or other cavity for optical communication purposes. In addition, the optical path length compensation is performed within the optical cavity itself, eliminating the need to mechanically rotate the optical cavity to keep the optical path length invariant as the angle of incidence of the received optical signal changes. Further, this approach may reduce manufacturing tolerances and stability requirements for an optical cavity having this structure (i.e., including the material 206 having an angle-dependent index of refraction as discussed above).

Embodiments of the etalon 200 may be useful in a wide variety of applications and systems. As discussed above, in certain embodiments, an optical receiver may include an optical resonator assembly including one or more etalons 200 that are used as modulation converters.

Figure 4:
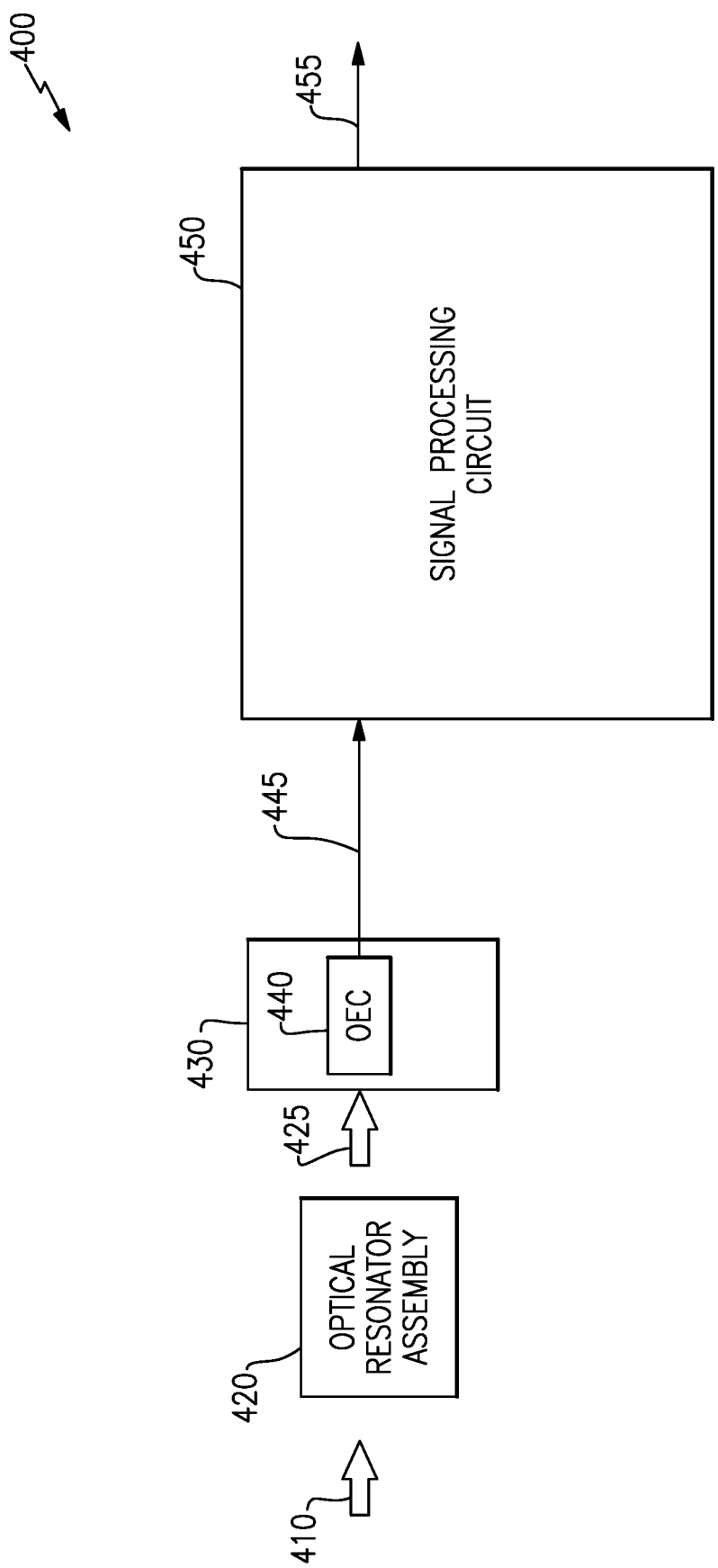
FIG. 4 is a functional block diagram of one example of an optical receiver according to certain aspects of the present invention.

FIG. 4 is a block diagram of one example of an optical receiver according to certain embodiments. The optical receiver 400 receives a modulated optical signal 410 transmitted along a free space signal path (e.g., free space optical, FSO), a fiber coupling, or another waveguide system from a transmitter (not shown). The optical receiver 400 includes an optical resonator assembly 420, a detector assembly 430 including at least one optical-electrical converter (OEC) 440, and a signal processing circuit 450. In certain examples, the detector assembly 430 and the signal processing circuit 450 may be collectively referred to as a detector. The detector assembly 430 and the signal processing circuit 450 may be separate components or may be part of a common module. The optical resonator assembly 420 is positioned to receive the modulated optical signal 410 and to produce an output optical signal 425 that has characteristics representative of the modulation of the modulated optical signal 410, as discussed further below. The detector assembly 430 receives the output optical signal 425 from the optical resonator assembly 420 and the at least one OEC 440 converts the optical signal 425 into an electrical signal 445 that can be processed by the signal processing circuit 450 to produce a decoded information signal 455. The decoded information signal 455 may include the information that was encoded on the modulated optical signal 410 by the modulation of the modulated optical signal 410. The OEC 440 may include one or more photo-diodes, for example, or other components capable of transforming an optical signal into an electrical signal. The signal processing circuit 450 may include various components, as will be understood by those skilled in the art, such as analog-to-digital converters, filters, amplifiers, controllers, etc., to condition and process the electrical signals received from the detector assembly 430 to produce the decoded information signal 455.

In certain examples, the optical resonator assembly 420 includes one or more optical cavity resonators configured to convert the modulation of the modulated optical signal 410 into intensity modulation of the output optical signal 425. As noted above, the modulated optical signal 410 may be phase modulated, amplitude modulated, and/or frequency modulated. As used herein, the term "optical resonator" refers to a component capable of sensing variations, such as frequency variations, amplitude variations, or phase variations in the received optical signal 410, and may include embodiments of the etalon 200 discussed above or similar optical cavity structures. Each optical resonator in the optical resonator assembly 420 converts the modulation of the arriving optical signal 410 in part by interaction of the arriving optical signal 410 with optical energy built-up in the resonator.

Figure 5:
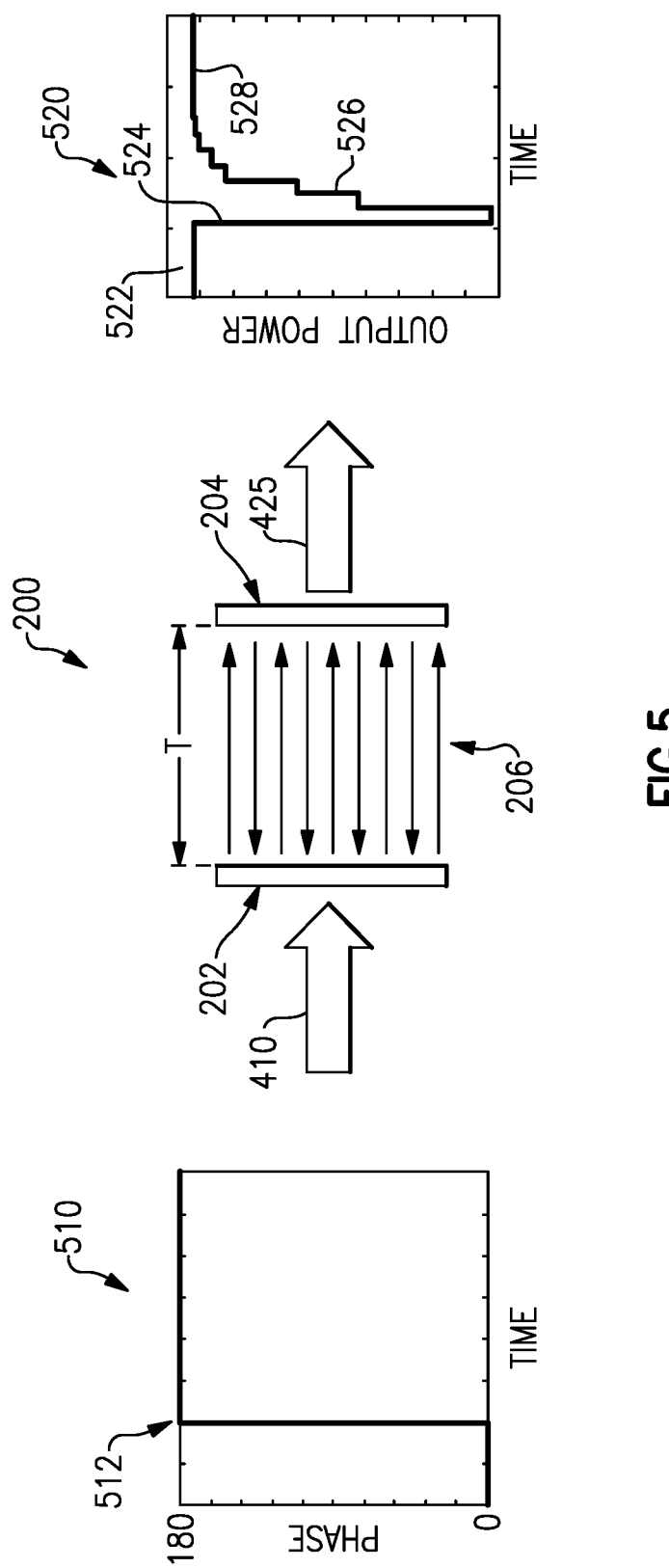
FIG. 5 is a diagram illustrating an example of operation of an etalon according to aspects of the present invention.

FIG. 5 illustrates an example of operation of an example of the etalon 200 used in the optical resonator assembly 420 of the optical receiver 400. The optical signal 410 received by the etalon 200 establishes a steady-state condition in which optical signal energy continuously arrives at the etalon 200, adds to the built-up resonating energy existing inside the etalon 200, and emerges from the etalon 200 at a constant rate. If the frequency, amplitude, or phase of the arriving optical signal 410 changes, this change causes a temporary disruption to the resonance inside the etalon 200 and the light intensity emerging from the etalon 200 is also disrupted, until a steady state condition is re-established. Accordingly, a change in phase, frequency, or amplitude of the arriving optical signal 410 causes a change in intensity of the output optical signal 425. Thus, the etalon 200 functions as a modulation converter for the optical signal 410. The output optical signal 425 may therefore carry the same information content as the arriving optical signal 410, but in an intensity modulated form, rather than a phase modulated form, for example.

FIG. 5 shows a graph 510 of the arriving modulated optical signal 410, showing a phase change in the optical signal 410. The graph 510 plots the phase (vertical axis) of the optical signal 410 over time (horizontal axis), showing a phase transition of pi (180 degrees) at point 512. FIG. 5 also shows a graph 520 of optical signal intensity (as output power) emerging from the etalon 200 during the phase transition in the received optical signal 410. At region 522 the etalon 200 is in a steady-state resonance condition wherein a steady intensity of light emerges. At point 524, corresponding to point 512 in the graph 510, a phase transition occurs in the arriving optical signal 410, temporarily disrupting the steady-state and causing a drop in the emerging light intensity. During successive reflections inside the etalon 200, and indicated region 526 in the graph 520, resonance is re-establishing, and the emerging light intensity increases until, at point 528, a steady intensity of light emerges when the etalon 200 has returned to a steady-state condition. Thus, variations in the intensity of the output optical signal 425 from the etalon 200 indicate that a transition occurred in the arriving optical signal 410, such as a phase transition due to phase modulation of the optical signal 410.

Thus, aspects and embodiments provide an optical receiver 400 that leverages the response of one or more etalons 200 to convert the modulation (phase, frequency, and/or amplitude) of an arriving optical signal 410 into an intensity-modulated output signal 425 that can be received and decoded to extract the information encoded on the modulated optical signal 410. In the example shown in FIG. 5, the output intensity/power from the etalon 200 exhibits a transient disturbance that is a temporary reduction in power; however, in other configurations the transient disturbance may instead be a temporary increase in response to a phase (or amplitude or frequency) transition occurring in the arriving modulated optical signal 410. As discussed above, the resonant condition or operating point, and therefore the output response, of the etalon 200 is a function of the optical path length of the etalon. Advantageously, using embodiments of the etalon 200 that are configured, using the material 206, to provide a relatively constant optical path length over a range of angles of incidence of the optical signal 410 allows the resonant condition of the etalon 200 to be stable over that range of incident angles. This may simplify and/or increase the accuracy of decoding the information encoded on the modulated optical signal 410 by eliminating or significantly reducing variations in the output signal 425 that otherwise may have been the result of variations in the angle of incidence of the optical signal 410. Accordingly, a more stable and robust optical receiver capable of operating over a wider angular range of acceptance may be provided.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical cavity comprising:
   a first semi-reflective surface;
   a second semi-reflective surface; and
   a material interposed between the first and second semi-reflective surfaces, the material having an index of refraction that varies as a function of an angle of propagation of light within the material, the material selected to provide a constant optical path length through the optical cavity over a range of angles of incidence of the light on the first semi-reflective surface.

2. The optical cavity of claim 1 wherein the first and second semi-reflective surfaces are disposed substantially parallel to one another, the material filling a gap between the first and second semi-reflective surfaces.

3. An optical receiver comprising:
   an optical resonator assembly including at least one optical resonator configured to receive an input optical signal and including a material having an index of refraction that varies as a function of an angle of propagation of light within the material, the material selected to provide a constant optical path length through an optical cavity over a range of angles of incidence of the light on a first semi-reflective surface of the optical cavity; and
   a detector configured to detect an intensity modulated output optical signal produced by the at least one optical resonator and to identify a modulation of the input optical signal based at least in part on an intensity modulation of the output optical signal;
   wherein the at least one optical resonator is configured to accumulate resonant optical signal energy inside the at least one optical resonator based at least in part on the input optical signal, and to produce the intensity modulated output optical signal, the intensity modulation of the output optical signal being representative of a modulation of the input optical signal, the at least one optical resonator being configured to maintain a selected resonant condition of the at least one optical resonator over the range of angles of incidence of the input optical signal at the at least one optical resonator.

4. The optical receiver of claim 3 wherein the at least one optical resonator includes:
   the first semi-reflective surface; and
   a second semi-reflective surface;
   the first and second semi-reflective surfaces disposed substantially parallel to one another, the material filling a gap between the first and second semi-reflective surfaces.

5. The optical receiver of claim 3 wherein the at least one optical resonator is a Fabry-Perot etalon.

6. The optical receiver of claim 3 wherein the at least one optical resonator is configured to maintain a selected resonator condition by maintaining a substantially constant optical thickness of the at least one optical resonator to the input optical signal over a range of angles of propagation of the input optical signal through the at least one optical resonator corresponding to the range of angles of incidence.

7. The optical receiver of claim 6 wherein the at least one optical resonator includes:
   the first semi-reflective surface positioned to receive the input optical signal;
   a second semi-reflective surface positioned facing the first semi-reflective surface and arranged to emit the output optical signal; and
   the material interposed between the first semi-reflective surface and the second semi-reflective surface, the at least one optical resonator being configured to accumulate resonant optical signal energy inside the at least one optical resonator and between the first semi-reflective surface and the second semi-reflective surface to approach a steady-state output value of the output optical signal, the intensity modulation of the output optical signal including a series of deviations from the steady-state output value.

8. The optical receiver of claim 6 wherein the at least one optical resonator is an etalon having a pair of semi-reflective surfaces including the first semi-reflective surface configured to at least partially trap resonant optical signal energy between the pair of semi-reflective surfaces by reflecting a portion of resonant optical signal energy between pair of semi-reflective surfaces, the etalon further including the material interposed between the pair of semi-reflective surfaces.

9. The optical receiver of claim 3 wherein the detector includes at least one optical-electrical converter configured to convert the output optical signal into an electrical signal.

10. A method comprising the acts of:
    receiving an input optical signal at an input of at least one optical resonator having a material interposed between first and second semi-reflective surfaces of the optical resonator, the material having an index of refraction that varies as a function of an angle of propagation of light within the material;
    accumulating a resonant condition with the at least one optical resonator based at least in part on the input optical signal to produce an intensity modulated output optical signal, an intensity modulation of the output optical signal being representative of a modulation of the input optical signal; and
    maintaining the resonant condition of the at least one optical resonator over a range of angles of incidence of the input optical signal at the at least one optical resonator by providing a constant optical path length through an optical cavity over the range of angles of incidence of the light on the first semi-reflective surface.

11. The method of claim 10, wherein fills a gap between the first and second semi-reflective surfaces.

12. The method of claim 10 wherein the at least one optical resonator is a Fabry-Perot etalon.

13. The method of claim 10 wherein the act of maintaining the resonant condition includes maintaining a substantially constant optical thickness of the at least one optical resonator to the input optical signal over a range of angles of propagation of the input optical signal through the at least one optical resonator corresponding to the range of angles of incidence.

14. The method of claim 13 further comprising:
    receiving the input optical signal at the first semi-reflective surface of the at least one optical resonator;
    emitting the output optical signal from the second semi-reflective surface positioned to face the first semi-reflective surface; and
    accumulating the resonant optical signal energy inside the at least one optical resonator and between the first semi-reflective surface and the second semi-reflective surface to approach a steady-state output value of the output optical signal, the intensity modulation of the output optical signal including a series of deviations from the steady-state output value, the material interposed between the first semi-reflective surface and the second semi-reflective surface.

15. The method of claim 13 wherein the act of receiving includes receiving the input optical signal with an etalon having a pair of semi-reflective surfaces, the etalon at least partially trapping the resonant optical signal energy between the pair of semi-reflective surfaces by reflecting a portion of resonant optical signal energy between pair of semi-reflective surfaces, the etalon further including the material interposed between the pair of semi-reflective surfaces.

16. The method of claim 10 further comprising:
converting the output optical signal into an electrical signal with at least one optical- electrical converter.

17. The method of claim 10 wherein the act of accumulating includes accumulating resonant optical signal energy inside the optical resonator based at least in part on the input optical signal, and providing the intensity modulated output optical signal, the intensity modulation of the output optical signal being representative of a modulation of the input optical signal, and maintaining a selected resonant condition of the at least one optical resonator over a range of angles of incidence of the input optical signal at the at least one optical resonator.

* * * * *